UNITED STATES PATENT OFFICE.

ALLEN ROGERS, OF BROOKLYN, NEW YORK.

INK AND PROCESS OF MAKING THE SAME.

1,224,668.

Specification of Letters Patent.  Patented May 1, 1917.

No Drawing.  Application filed February 1, 1917. Serial No. 145,925.

*To all whom it may concern:*

Be it known that I, ALLEN ROGERS, a citizen of the United States, residing at Brooklyn, in the county of Kings and State of New York, have invented certain new and useful Improvements in Inks and Processes of Making the Same, of which the following is a specification.

This invention relates to inks and processes of making the same; and it comprises an ink for printing and like purposes containing a deodorized thickened residuum of asphalt base petroleum, a thinning oil, a resin, and a pigment, such as carbon black; and it also comprises a method of making such inks wherein residuum from asphalt base petroleum is exposed to a heat treatment of relatively long duration, whereby it is thickened and freed of odor, and is thereafter thinned with 40° Baumé petroleum oil, known commercially as "300 oil" or any other indifferent petroleum oil, the quantity being somewhat larger than the quantity of the above heat treated residuum, the thinned oil then receiving an addition of about five pounds of ordinary rosin and one quarter pound of soap for every hundred pounds of thinned oil together with sufficient pigment, usually carbon black; all as more fully hereinafter set forth and as claimed.

The original and typical news ink was composed of linseed oil blown or heated until very thick and then mixed with lampblack or other pigment. It was in effect a thick black paint. On the paper it was expected to dry as any other paint would dry, viz. by absorption of oxygen and production of linoxin. This drying, however, was too slow for high speed newspaper machinery and inks of a different kind are used at present. With these inks the "drying" is not really drying; it is more an absorption by the paper of the liquid vehicle of the ink, leaving the pigment on the surface.

In other words the capillarity of the paper is relied upon to accomplish a complex result. The vehicle of the ink, or the component which renders the ink thin enough to be taken up by type and transferred to the paper, must instantly diffuse into the paper without taking enough color with it to blur the letter while on the other hand the pigment must remain as a sharp distinct layer fixed to the paper by enough binder to prevent dusting away. And what so to speak, be varnished down. And what happens must happen very quickly or the printing will smear. In order to produce sharp and distinct characters it is evidently necessary to have special relations between the vehicle and the other components of the ink. Ink has been made of a residuum from petroleum oils of paraffin base type, mingled with pigment, the thick vehicle being absorbed in use on the paper the way stated. The residuum used was that produced in the ordinary distillation of oil after various useful fractions had been taken off and was generally an oil of about 27° Baumé with a viscosity of 170. In this ink, the residuum was relied upon for all the functions above stated; it was at once supposed to dissipate in the paper and also to stay with the pigment to hold it down.

I have found that better results may be obtained by making a 3-component ink with one component a residuum, but a residuum of thicker consistency and different type while another component is an oil whose function is purely that of a thinner; something which will make the oil composition, or ink, fluent enough to be taken up by type and transferred to paper. This oil should be thin enough to be taken up rapidly by the paper. In other words, instead of taking a residuum of petroleum base oil and trusting that some component will be thin enough to be taken up by the paper while other components stay with the pigment, I purposely take two different types of material; one a special residuum and the other a relatively thin oil.

The best residuum for my purposes is a specially treated residuum from an asphalt base petroleum. Such a residuum I treat by a prolonged exposure to heat. It may be blown with steam or with air, or it may be directly heated. In either event, the heating is prolonged until no noticeable odor remains in the residuum. The heating operation has several effects apart from that of dispelling the odor. It carries forward the asphaltization of the oil and makes a material which works better on the paper. But, after the heating, the material, while improved as stated, is now too thick for use in inks alone in the manner hereinbefore stated. Ordinarily it is about 0.96 sp. g., or 14.5° Baumé. In order to make my ink, I take this thickened residuum and mix it with about 30 per cent. of lighter petroleum oil, which may advantageously be a particular distillate of about 40° Baumé, commercially known as "300° oil". The thinning oil allows the mixture to be applied to type and to be transferred therefrom to paper, giving about the right amount of thinness for this purpose. The thinning oil is absorbed by the paper, but the asphaltic residuum, which is a strongly colored material, does not travel with it, remaining with and fixing the pigment in place. With properly made ink under the present invention this asphaltic material does not travel far enough in the paper to blur the letter; the impressions of the type are sharp and distinct; and it does not smear when the paper is folded. By reason of its very dark color it permits an important economy in the amount of pigment necessary.

The composition of heat treated asphalt residuum and thinning oil can be admixed with pigment and at once gives a good and suitable ink. Its properties may, however, be still further improved by adding also a little rosin and soap; these additions still further improving the capillary separation which is the basis of the use of the ink in printing.

For 100 pounds of thinned residuum produced as just described I may take 5 pounds of ordinary rosin and one quarter pound of soap, heat until the mixture is fluid, and stir together with the thinned residuum and 10 pounds of carbon black. Any other pigment may be used in lieu of carbon black, but carbon black is the best.

The oily composition made as described is deep in color and produces an exceptionally brilliant black ink. The rosin and the asphalt of the material together bind the pigment in place and do not travel through the paper to any extent. Most of the capillary travel is of the colorless thinning oil.

The best kind of soap for the present purposes is the grade commercially known as chip soap; a good grade of unscented curd soap cut into small flakes or chips.

I find that with asphaltic base residuum treated in the manner described much less rosin and carbon black or lamp black are required for making an ink of satisfactory opaqueness than with most other vehicles known.

In using this ink for half-tone prints, a very pleasing tone is obtained, being of a sepia suggestion rather than the dull black and white ordinarily observed in daily newspapers.

A news ink containing about 39 per cent. of the thickened asphalt base residuum, about 47 per cent. of a good thin petroleum oil, such as the stated 300° oil, about 4 per cent. of ordinary good quality rosin, about 0.25 per cent. of chip soap and about 10 per cent. of a good quality lampblack, proves very satisfactory in practice for high speed printing machinery with the ordinary and usual grades of news paper.

What I claim is:—

1. A news ink comprising an odorless and thickened asphalt base petroleum residuum, a thinning of oil of about 40° Baumé, rosin and pigment.

2. A news ink comprising an odorless and thickened asphalt base petroleum residuum, a thinning oil of about 40° Baumé, rosin, soap, and a pigment.

3. A news ink comprising an odorless and thickened asphalt base petroleum residuum, a thinning oil, rosin and pigment.

4. A news ink comprising an odorless and thickened asphalt base petroleum residuum, a thinning oil, rosin, soap and a pigment.

5. A news ink comprising about 39 per cent. thickened and odorless asphalt base residuum, about 47 per cent. oil of 40° Baumé, known as 300°, about 4 per cent. rosin, about 0.25 per cent. chip soap, and about 10 per cent. carbon black.

6. The process of making a news ink which comprises heating an asphalt base petroleum residuum until the same is thickened and odorless, thinning with a petroleum oil and incorporating rosin, soap and pigment.

7. The process of making a news ink which comprises heating an asphalt base petroleum residuum until the same is thickened and odorless, thinning with a petroleum oil and incorporating rosin and pigment.

8. The process of making a news ink which comprises heating an asphalt base petroleum residuum until the same is odorless and acquires a density of about 14.5 Baumé, mixing with about two-thirds its volume of 300° oil, adding about 5 per cent. rosin and incorporating about twelve per cent. carbon black.

9. The process of making a news ink which comprises heating an asphalt base petroleum residuum until the same is odorless and acquires a density of about 14.5 Baumé, mixing with about two-thirds its volume of 300° oil, adding about 5 per cent. rosin and incorporating twelve per cent. carbon black and one quarter per cent. soap.

In testimony whereof, I affix my signature.

ALLEN ROGERS.

Witnesses:
J. C. MADDOCK,
J. P. McALLON.